(12) United States Patent
Kang

(10) Patent No.: US 11,605,299 B2
(45) Date of Patent: Mar. 14, 2023

(54) VEHICLE AND CONTROL METHOD THEREOF

(71) Applicant: HL Klemove Corp., Pyeongtaek (KR)

(72) Inventor: Boryeon Kang, Seongnam (KR)

(73) Assignee: HL Klemove Corp., Incheon (KR)

( * ) Notice: Subject to any disclaimer, the term of this patent is extended or adjusted under 35 U.S.C. 154(b) by 219 days.

(21) Appl. No.: 17/120,736

(22) Filed: Dec. 14, 2020

(65) Prior Publication Data
US 2021/0192955 A1 Jun. 24, 2021

(51) Int. Cl.
*B60W 30/09* (2012.01)
*G08G 1/16* (2006.01)

(52) U.S. Cl.
CPC ............. *G08G 1/167* (2013.01); *B60W 30/09* (2013.01); *B60W 2420/42* (2013.01); *B60W 2552/53* (2020.02); *B60W 2554/4041* (2020.02); *B60W 2554/4045* (2020.02)

(58) Field of Classification Search
CPC .............. G08G 1/167; B60W 30/09; B60W 2420/42; B60W 2552/53; B60W 2554/4041; B60W 2554/4045; B60W 2720/106; B60W 30/0956; B60W 30/18163; B60W 50/14; B60W 2554/801; B60W 2554/803; B60W 30/08; B60W 40/02; B60W 40/10; B60W 2520/10; G06V 20/58; G06V 20/588
See application file for complete search history.

(56) References Cited

U.S. PATENT DOCUMENTS

| | | | | |
|---|---|---|---|---|
| 2006/0233425 A1* | 10/2006 | Kobayashi | ........... | G06V 20/588 382/106 |
| 2009/0102922 A1* | 4/2009 | Ito | .......... | H04N 7/181 348/148 |
| 2010/0259609 A1* | 10/2010 | Takahashi | ........ | G08G 1/096716 348/148 |
| 2015/0258988 A1* | 9/2015 | Morimoto | ............. | B60K 28/10 701/70 |
| 2016/0284218 A1* | 9/2016 | Ejiri | ....................... | G08G 1/166 |
| 2017/0212527 A1* | 7/2017 | Park | ........................ | H04L 67/52 |
| 2018/0037230 A1* | 2/2018 | Otake | .................. | B60W 10/06 |
| 2018/0129891 A1* | 5/2018 | Ryu | ........................ | G06V 40/18 |
| 2018/0354523 A1* | 12/2018 | Kishi | .................... | B60W 50/14 |

FOREIGN PATENT DOCUMENTS

KR 1020170141017 A 12/2017
KR 1020190109622 A 9/2019

* cited by examiner

Primary Examiner — Peter D Nolan
Assistant Examiner — Ashley L Redhead, Jr.
(74) Attorney, Agent, or Firm — Harvest IP Law LLP

(57) ABSTRACT

The present disclosure relates to a host vehicle and control method thereof, according to one aspect of the present disclosure, the purpose is to enable quick and accurate recognition of cut-in vehicles that change lanes from adjacent lanes to travel lanes. Disclosed are a control method of a host vehicle, the method including: obtaining a front image by photographing the front of the host vehicle; identifying left and right lines of a travel lane in which the host vehicle is traveling from the front image; determining that a vehicle cutting-in from an adjacent lane to the travel lane exists when the lengths of the left line and the right line of the travel lane are different from each other in the front image.

19 Claims, 8 Drawing Sheets

VEHICLE AND CONTROL METHOD THEREOF

CROSS-REFERENCE TO RELATED APPLICATION

This application is based on and claims priority under 35 U.S.C. § 119 to Korean Patent Application No. 10-2019-0172222, filed on Dec. 20, 2019 in the Korean Intellectual Property Office, the disclosure of which is incorporated herein by reference.

BACKGROUND

1. Field

The present disclosure relates to a vehicle, and to a vehicle having a driver assistance system for assisting a driver.

2. Description of the Related Art

Generally, a vehicle refers to a movement device or transportation device, designed to travel on a road or railway using fossil fuel, electric power, and the like as a power source. The vehicle may move to various positions mainly using one or more wheels installed on the vehicle body. Such a vehicle may include a three-wheeled or four-wheeled vehicle, a two-wheeled vehicle, such as a motorcycle, a construction machine, a bicycle, and a train traveling on a railway arranged on a track.

Vehicles are the most common means of transportation in modern society, and the number of people using them is increasing. Due to the development of vehicle technology, long-distance movement is easy and life is easier. However, in places with a high population density, road traffic conditions deteriorate and traffic congestion often occurs.

Recently, there have been active studies on a vehicle equipped with an advanced driver assist system (ADAS), which actively provides information about the state of a vehicle, the state of a driver, and the surrounding environment to reduce the burden on the driver while enhancing the convenience of the driver.

ADAS includes 'Autonomous Emergency Braking (AEB)', which reduces or stops the vehicle's velocity by itself even if the driver does not operate the brake system in case of a collision risk, 'Lane Keep Assist System (LKAS)', which maintains the lane by adjusting the driving direction when the line deviates, 'Advanced Smart Cruise Control (ASCC)', which maintains an adequate distance with the preceding vehicle while driving at a preset velocity, 'Active Blind Spot Detection (ABSD)', which detects the risk of collision in blind spots and helps to change lanes safely, and 'Around View Monitor (AVM)' that visually shows the situation around the vehicle.

Among them, the AEB can provide safer driving assistance control when the vehicle cutting-in from the adjacent lane to the travel lane as well as the preceding vehicle in the travel lane in which the host vehicle is traveling are the target vehicle.

SUMMARY

According to one aspect of the present disclosure, the purpose is to enable quick and accurate recognition of cut-in vehicles that change lanes from adjacent lanes to travel lanes.

Therefore, it is an aspect of the present disclosure to provide a method of controlling a host vehicle, including: obtaining a front image by photographing the front of the host vehicle; identifying left and right lines of a travel lane in which the host vehicle is traveling from the front image; determining that a vehicle cutting-in from an adjacent lane to the travel lane exists when the lengths of the left line and the right line of the travel lane are different from each other in the front image.

The method may further include: identifying a nearby vehicle traveling around the host vehicle from the front image; and determining that the cut-in vehicle exists when the lengths of the left line and the right line of the travel lane are different from each other in the front image in the presence of the nearby vehicle.

The method may further include: determining that the cut-in vehicle exists on a side whose length of the line in the front image is relatively shorter among the left line and the right line of the travel lane.

The method may further include: determining that the cut-in vehicle exists on a side where the middle part is disconnected in the front image among the left line and the right line of the travel lane.

The method may further include: determining cut-in intention of the nearby vehicle from the lengths of the left line and the right line of the travel lane in the front image; determining the nearby vehicle as the cut-in vehicle from the lateral velocity and distance from the line of the nearby vehicle.

The method may further include: when it is determined that the cut-in vehicle exists, securing an entry space for the cut-in vehicle by adjusting the velocity of the host vehicle according to the relative velocity and relative distance of the cut-in vehicle.

It is another aspect of the present disclosure to provide a host vehicle including: a front camera configured to obtain a front image by photographing the front of the host vehicle; and a controller configured to identify left and right lines of a travel lane in which the host vehicle is traveling from the front image and determine that a vehicle cutting-in from an adjacent lane to the travel lane exists when the lengths of the left line and the right line of the travel lane are different from each other in the front image.

The controller may be configured to identify a nearby vehicle traveling around the host vehicle from the front image and determine that the cut-in vehicle exists when the lengths of the left line and the right line of the travel lane are different from each other in the front image in the presence of the nearby vehicle.

The controller may be configured to determine that the cut-in vehicle exists on a side whose length of the line in the front image is relatively shorter among the left line and the right line of the travel lane.

The controller may be configured to determine that the cut-in vehicle exists on a side where the middle part is disconnected in the front image among the left line and the right line of the travel lane.

The controller may be configured to determine cut-in intention of the nearby vehicle from the lengths of the left line and the right line of the travel lane in the front image and determine the nearby vehicle as the cut-in vehicle from the lateral velocity and distance from the line of the nearby vehicle.

When it is determined that the cut-in vehicle exists, the controller may be configured to secure an entry space for the cut-in vehicle by adjusting the velocity of the host vehicle according to the relative velocity and relative distance of the cut-in vehicle.

It is another aspect of the present disclosure to provide a control method of a host vehicle including: obtaining a front image by photographing the front of the host vehicle; identifying a nearby vehicle traveling around the host vehicle from the front image; identifying left and right lines of a travel lane in which the host vehicle is traveling from the front image; determining that a vehicle cutting-in from an adjacent lane to the travel lane exists when the lengths of the left line and the right line of the travel lane are different from each other in the front image in the presence of the nearby vehicle; and determining that the cut-in vehicle exists on a side whose length of the line in the front image is relatively shorter or on a side where the middle part is disconnected in the front image.

It is another aspect of the present disclosure to provide a non-transitory computer-readable medium storing computer-executable instructions when executed by a processor to perform a method of controlling a host vehicle, the method comprising: obtaining a front image by photographing the front of the host vehicle; identifying left and right lines of a travel lane in which the host vehicle is traveling from the front image; determining that a vehicle cutting-in from an adjacent lane to the travel lane exists when the lengths of the left line and the right line of the travel lane are different from each other in the front image.

The method further include: identifying a nearby vehicle traveling around the host vehicle from the front image; and determining that the cut-in vehicle exists when the lengths of the left line and the right line of the travel lane are different from each other in the front image in the presence of the nearby vehicle.

The method may further include: determining that the cut-in vehicle exists on a side whose length of the line in the front image is relatively shorter among the left line and the right line of the travel lane.

The method may further include: determining that the cut-in vehicle exists on a side where the middle part is disconnected in the front image among the left line and the right line of the travel lane.

The method may further include: determining cut-in intention of the nearby vehicle from the lengths of the left line and the right line of the travel lane in the front image; determining the nearby vehicle as the cut-in vehicle from the lateral velocity and distance from the line of the nearby vehicle.

The method may further include: when it is determined that the cut-in vehicle exists, securing an entry space for the cut-in vehicle by adjusting the velocity of the host vehicle according to the relative velocity and relative distance of the cut-in vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
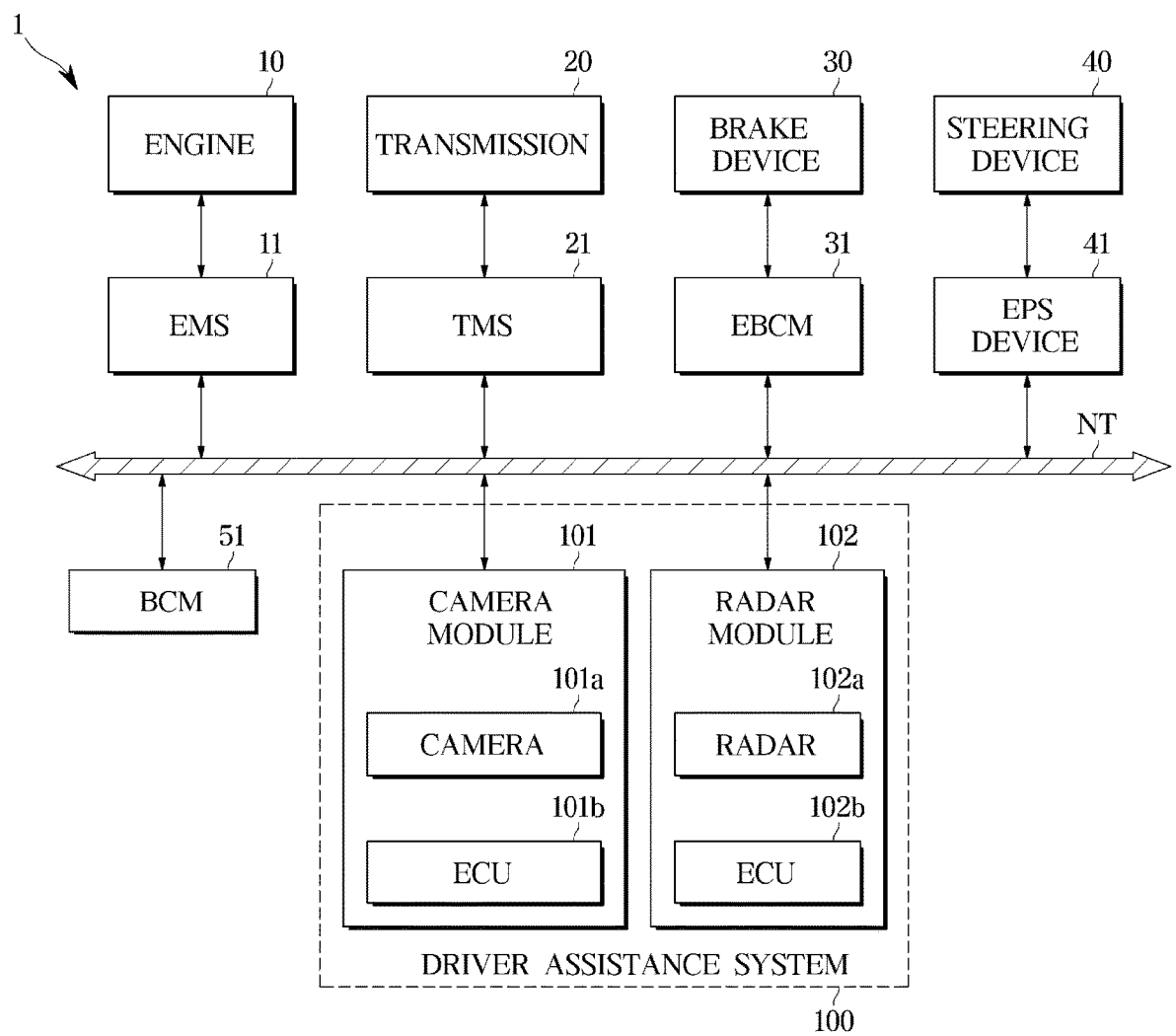
FIG. 1 is a block diagram illustrating a configuration of a vehicle according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that one member is "on" another member, the member may be directly on the other member or a third member may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

FIG. 1 is a block diagram illustrating a configuration of a vehicle according to an embodiment.

Referring to FIG. 1, a vehicle 1 includes an engine 10, a transmission 20, a braking device 30, and a steering device 40. The engine 10 may include a cylinder and a piston, and generate power required for the vehicle 1 to travel. The transmission 20 may include a plurality of gears, and transmit the power generated by the engine 10 to wheels. The braking device 30 may decelerate or stop the vehicle 1 through friction with the wheels. The steering device 40 may change the heading direction of the vehicle 1.

The vehicle 1 may include a plurality of machine parts. For example, the vehicle 1 may include an engine management system (EMS) 11, a transmission controller (TCU) 21, an electronic brake controller (EBCM) 31, an electronic power steering (EPS) 41, a body controller (BCM) 51, and a driver assistance system (DAS) 100.

The EMS 11 may control the engine 10 in response to an acceleration intention of the driver through an accelerator pedal or a request of the DAS 100. For example, the EMS 11 may control the torque of the engine 10.

The TCU 21 may control the transmission 20 in response to a shift command of the driver through a shift lever and/or a travelling speed of the vehicle 1. For example, the TCU 21 may adjust the gear ratio of the engine 10 to the wheels.

The EBCM 31 may control the braking device 30 in response to a braking intention of the driver through a braking pedal and/or a slip of the wheels. For example, the EBCM 31 may temporarily release the braking of the wheels in response to a slip of the wheels sensed at a time of braking the vehicle 1 (anti-lock braking systems: ABS). The EBCM 31 may selectively release braking of the wheels in response to over-steering and/or under-steering sensed at a time of steering the vehicle 1 (electronic stability control: ESC). In addition, the EBCM 31 may temporarily brake the wheels in response to a slip of the wheels sensed at a time of driving the vehicle 1 (traction control system: TCS).

The EPS 41 may assist the operation of the steering device 40 in response to a steering intention of the driver through the steering wheel such that the driver may easily operate the steering wheel. For example, the EPS 41 may assist the operation of the steering device 40 such that the steering force is reduced during low-speed travelling or parking and the steering force is increased during high-speed travelling.

The BCM 51 may control the operation of machine parts that provide convenience to the driver or ensure the safety of the driver. For example, the BCM 51 may control a head lamp, a wiper, a cluster, a multifunction switch, a direction indicator lamp, and the like.

The DAS 100 may assist the driver in manipulating (driving, braking, and steering) the vehicle 1. For example, the DAS 100 may sense a surrounding environment of the vehicle 1 (e.g., another vehicle, a pedestrian, a cyclist, a lane, a road sign, and the like), and control driving and/or braking and/or steering of the vehicle 1 in response to the sensed environment.

The DAS 100 may provide the driver with various functions. For example, the DAS 100 may include a lane departure warning (LDW), a lane keeping assist (LKA), a high beam assist (HBA), an automatic emergency braking (AEB), a traffic sign recognition (TSR), a smart cruise control (SCC), a blind spot detection (BSD), and the like.

The DAS 100 includes a camera 101 that acquires image data of the surrounding of the vehicle 1 and a radar 102 that acquires object data of the surrounding of the vehicle 1. The camera 101 may include a camera 101*a* and an electronic controller (ECU) 101*b*, and photograph at least one of the front side or the lateral side of the vehicle 1 and recognize another vehicle, a pedestrian, a cyclist, a lane, a road sign, and the like. The radar 102 may include a radar 102*a* and an ECU 102*b*, and acquire a relative position, a relative velocity, and the like of an object of the surrounding of the vehicle 1 (e.g., another vehicle, a pedestrian, a cyclists, and the like).

The driver assistance system 100 is not limited to the one shown in FIG. 1, and may further include a LiDAR that scans around the vehicle 1 and detects an object.

The above described electronic components may communicate with each other through vehicle communication network NT. For example, the machine parts may transmit data through Ethernet, media oriented systems transport (MOST), Flexray, controller area network (CAN), local interconnect network (LIN), and the like. For example, the DAS 100 may transmit a driving control signal, a braking signal, and a steering signal to the EMS 11, the EBCM 31, and the EPS 41, respectively.

Figure 2:
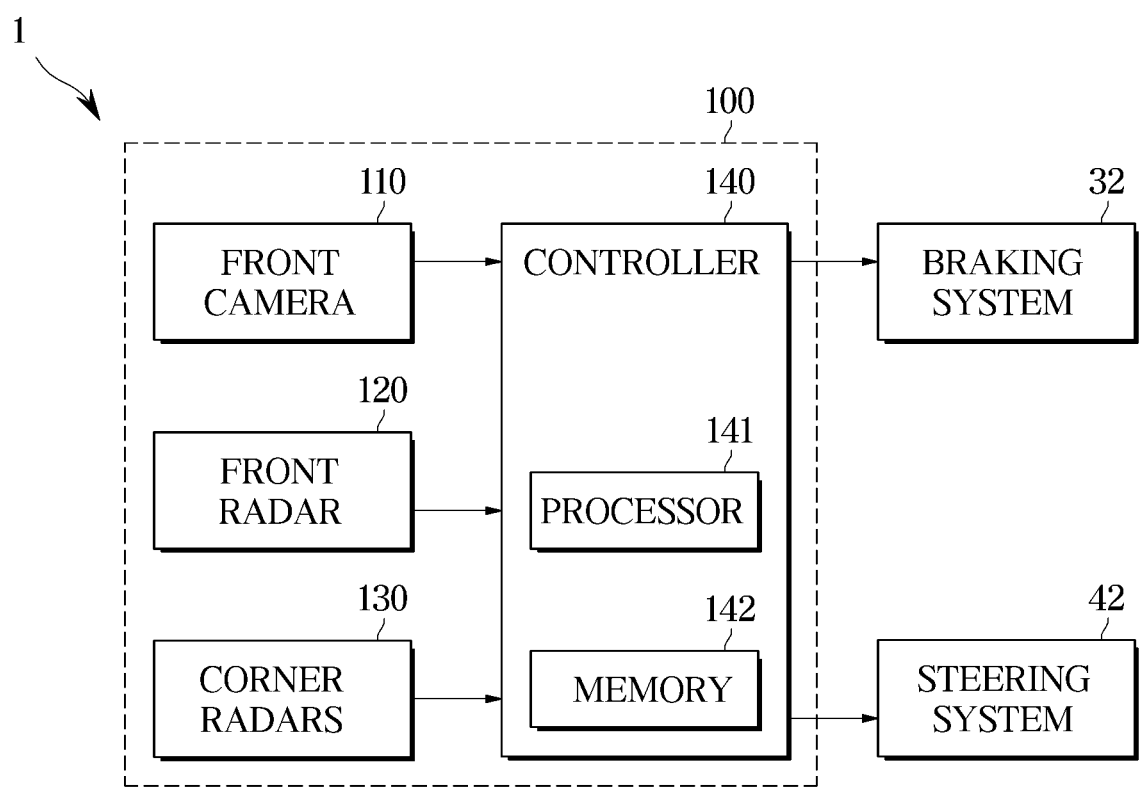
FIG. 2 is a block diagram illustrating a configuration of a driver assistance system according to an embodiment.
Figure 3:
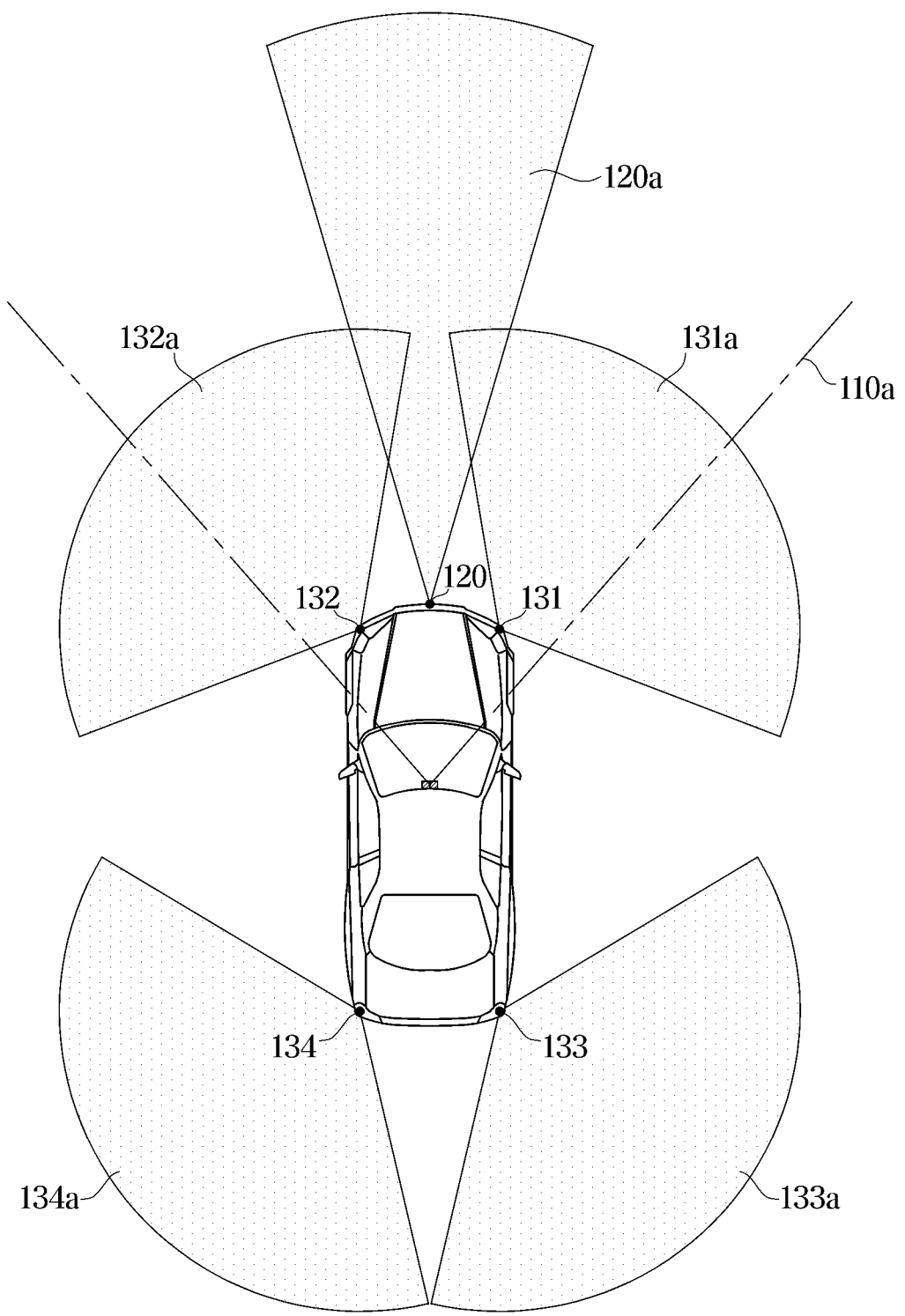
FIG. 3 is a diagram illustrating the operation of a camera and a radar included in a driver assistance system of a vehicle according to an embodiment.

FIG. 2 is a block diagram illustrating a configuration of a DAS according to an embodiment. FIG. 3 is a view illustrating a camera and a radar included in a DAS according to an embodiment.

Referring to FIG. 2, the vehicle 1 may include a braking system 32, a steering system 42, and a DAS 100.

The braking system 32 includes the EBCM (31 in FIG. 1) and the braking device (30 in FIG. 1), which have been described with reference to FIG. 1, the steering system 42 includes the EPS (41 in FIG. 1) and the steering device (40 in FIG. 1).

The DAS 100 may include a front camera 110, a front radar 120, and a plurality of corner radars 130.

The front camera 110 may have a field of view 110*a* facing the front of the vehicle 1 as shown in FIG. 3. The front camera 110 may be installed, for example, on the front windshield of the vehicle 1.

The front camera 110 may photograph the front of the vehicle 1 and acquire image data of the front of the vehicle 1. The image data of the front of the vehicle 1 may include position information of another vehicle, a pedestrian, a cyclist, or a lane existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to the controller 140. For example, the front camera 110 may be connected to the controller 140 through a vehicle communication network NT, may be connected to the controller 140 through a hard wire, or may be connected to the controller 140 through a printed circuit board (PCB).

The front camera 110 may transmit image data in front of the vehicle 1 to the controller 140.

The front radar 120 may have a field of sensing 120*a* facing the front of the vehicle 1 as shown in FIG. 3. The front radar 120 may be installed, for example, on a grille or bumper of the vehicle 1.

The front radar 120 may include a transmission antenna (or a transmission antenna array) that radiates transmission radio waves forward of the vehicle 1 and a reception antenna (or a reception antenna array) that receives reflected radio waves reflected from an object. The front radar 120 may acquire front radar data from the transmission radio waves transmitted by the transmission antenna and the reflected radio waves received by the reception antenna. Front radar data may include distance information and velocity information regarding another vehicle, a pedestrian, or a cyclist existing in front of the vehicle 1. The front radar 120 may calculate the relative distance to the object based on the phase difference (or time difference) between the transmission radio waves and the reflected radio waves, and calculate the relative velocity of the object based on the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed toward the front right side of the vehicle 1 as shown in FIG. 3. The first corner radar 131 may be installed on the right side of the front bumper of the vehicle 1, for example. The second corner radar 132 may have a field of sensing 132a directed toward the front left side of the vehicle 1, and may be installed on the left side of the front bumper of the vehicle 1, for example. The third corner radar 133 may have a field of sensing 133a directed toward the rear right side of the vehicle 1 and may be installed on the right side of the rear bumper of the vehicle 1, for example. The fourth corner radar 134 may have a field of sensing 134a directed toward the rear left side of the vehicle 1 and may be installed on the left side of the rear bumper of the vehicle 1, for example.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance information and velocity information regarding another vehicle, a pedestrian, or a cyclist (hereinafter referred to as "an object") positioned on the front right side of the vehicle 1. The second corner radar data may include distance information and velocity information regarding an object positioned on the front left side of the vehicle 1. The third and fourth corner radar data may respectively include distance and velocity information regarding an object located on the rear right side of the vehicle 1 and distance and velocity information regarding an object located on the rear left side of the vehicle 1.

Each of the first, second, third, and fourth corner radars 131, 132, 133 and 134 may be connected to the controller 140 through a vehicle communication network NT, a hard wire, or a printed circuit board, for example. The first, second, third, and fourth corner radars 131, 132, 133, and 134 may respectively transmit the first corner radar data, the second corner radar data, the third corner radar data, and the fourth corner radar data to the controller 140.

The controller 140 may include the ECU (101b in FIG. 1) of the camera (101 in FIG. 1) and/or the ECU (102b in FIG. 1) of the radar (102 in FIG. 1), and/or an integrated ECU.

The controller 140 includes a processor 141 and a memory 142.

The processor 141 may process the front image data of the front camera 110, the front radar data of the front radar 120 and the corner radar data of the plurality of corner radars 130, and generate a braking signal and a steering signal for controlling the braking system 32 and the steering system 42. For example, the processor 141 may include an image signal processor for processing front image data of the front camera 110 and/or a digital signal processor for processing radar data of the radars 120, 130 and/or a micro controller (MCU) for generating a braking signal and a steering signal.

The processor 141 may sense objects (e.g., another vehicle, a pedestrian, a cyclist, and the like) front of the vehicle 1 based on the front image data of the front camera 110 and the front radar data of the front radar 120.

In detail, the processor 141 may acquire position (distance and direction) and relative velocity of the objects in front of the vehicle 1 based on the front radar data of the front radar 120. The processor 141 may acquire position (direction) and type information (for example, whether the object is another vehicle, a pedestrian, or a cyclist) of the object in front of the vehicle 1 based on the front image data of the front camera 110. In addition, the processor 141 allows the object sensed by the front image data to match the object sensed by the front radar data, and acquires the type information, the position, and the relative velocity of the front objects of the vehicle 1 based on a result of the matching.

The processor 141 may generate a braking signal and a steering signal based on the type information, the position, and the relative velocity of the front objects.

For example, the processor 141 calculates a time to collision (TTC) between the vehicle 1 and the front object based on the position (distance) and the relative velocity of the front object, and warns the driver of a collision or transmits a braking signal to the braking system 32 based on a result of comparing the TTC with a predetermined reference time. In response to the TTC less than a predetermined first reference time, the processor 141 may allow an alert to be output via audio and/or display. In response to the TTC less than a predetermined second reference time, the processor 141 may transmit a preliminary-braking signal to the braking system 32. In response to the TTC less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) based on the relative speed of front objects, and warn the driver of a collision or transmit a braking signal to the braking system 32 based on a result of comparing the DTC with distances to the front objects.

The processor 141 may acquire position (distance and direction) and relative velocity of the objects on the sides of the vehicle 1 (front right, front left, rear right, and rear left) based on corner radar data of the plurality of corner radars 130.

The processor 141 may transmit a steering signal to the steering system 42 based on the position (distance and direction) and relative velocity of the objects on the sides of the vehicle 1.

For example, when a collision with a front object is determined based on the time to collision or the distance to the collision, the processor 141 may transmit a steering signal to the steering system 42 to avoid collision with the front object.

The processor 141 may determine whether to avoid a collision with a front object by changing the driving direction of the vehicle 1 based on the position (distance and direction) and relative velocity of the lateral objects of the vehicle 1. For example, when there is no object located on the side of the vehicle 1, the processor 141 may transmit a steering signal to the steering system 42 in order to avoid a collision with a front object. When the collision with the lateral object is not predicted after the steering of the vehicle 1 based on the position (distance and direction) and the relative velocity of the lateral objects, the processor 141 may transmit a steering signal to the steering system 42 in order to avoid a collision with a front object. When a collision with a lateral object is predicted after steering of the vehicle 1 based on the position (distance and direction) and relative velocity of the lateral objects, the processor 141 may not transmit the steering signal to the steering system 42.

The memory 142 stores programs and/or data for processing image data by the processor 141, programs and/or data for processing radar data by the processor 141, and programs and/or data for generating a braking signal and/or a steering signal by the processor 141.

The memory 142 may temporarily store the image data received from the front camera 110 and/or the radar data received from the radars 120 and 130, and may temporarily store a result of processing the image data and/or the radar data of the processor 141.

The memory 142 may include a volatile memory, such as an S-RAM, a D-RAM, and the like, and a non-volatile memory, such as a flash memory, a read only memory (ROM), an erasable programmable read only memory (EPROM), and the like.

The DAS 100 is not limited to the one illustrated in FIG. 2, and may further include a LiDAR that scans around the vehicle 1 and detects an object.

As such, the controller 140 may transmit a braking signal to the braking system 32 based on whether a collision with the front object is predicted to occur. When a side object is not present or a collision with a side object is not predicted to occur, the controller 140 may transmit a steering signal to the steering system 42 to avoid a collision with a front object. When a collision with a side object is predicted to occur after the steering, the controller 140 may not transmit the steering signal to the steering system 42.

'Lane', 'line', 'travel lane', 'adjacent lane', and 'nearby vehicle' to be mentioned in the following description may be defined as follows, respectively. A 'lane' means a part of the road on which a vehicle travels, separate from the sidewalk through which pedestrians pass. A 'lane' is a part of a road that is divided by lines so that a vehicle passes through a designated area in one line. A 'line' means a line drawn at regular intervals along the driving direction on the road the vehicle is traveling on. One 'lane' is a pair of left line and right line, and can be separated from other adjacent lanes by a line. A 'travel lane' refers to the lane in which the host vehicle 1 to which the present disclosure is applied is traveling. An 'adjacent lane' means another lane located on the left or right side of the travel lane. A 'Nearby vehicle' means another vehicle traveling on an adjacent lane (see 602 in FIGS. 6 to 8).

Figure 4:
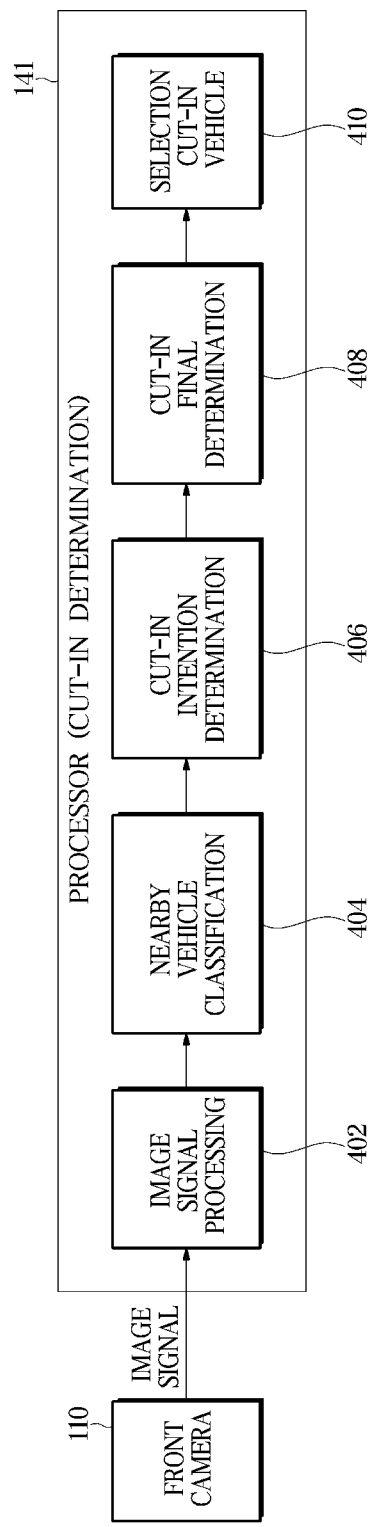
FIG. 4 is a diagram illustrating a process of selecting a cut-in vehicle by a processor provided in a controller of a driver assistance system of a vehicle according to an embodiment.

FIG. 4 is a diagram illustrating a process of selecting a cut-in vehicle by a processor provided in a controller of a driver assistance system of a vehicle according to an embodiment.

As shown in FIG. 4, the process of selecting a cut-in vehicle of a vehicle according to an embodiment of the present disclosure includes 'image signal processing', 'nearby vehicle classification', 'cut-in intention determination', 'cut-in final determination', and 'selection a cut-in vehicle'.

In the 'image signal processing' process, the vehicle receives a signal of an image photographed in front of the vehicle 1 through the front camera 110 from the front camera 110 and performs digital signal processing.

In the 'nearby vehicle classification' process, the vehicle classifies nearby vehicles located in the left front or right front of the host vehicle 1 through analysis of the front image. Since the determination and selection of the cut-in vehicle is to determine and select the other vehicle cutting-in from the adjacent lane to the travel lane, it is necessary to identify and classify other vehicles in the adjacent lane, that is, nearby vehicles.

In the 'cut-in intention determination' process, by applying a determination reference prepared in advance of the vehicle 1 according to an embodiment of the present disclosure, the cut-in intention of other vehicles traveling in the adjacent lane is determined.

In the 'cut-in final determination' process, the vehicle determines whether other vehicles classified as vehicle having cut-in intention are actually intervening by applying another determination reference prepared in advance of the vehicle 1 according to the present disclosure.

In the 'selection a cut-in vehicle' process, the vehicle selects the actual cut-in vehicle determined through "cut-in final determination" as the vehicle to be cautioned (avoided).

A process of selection a cut-in vehicle according to an embodiment of the present disclosure will be described in more detail with reference to FIGS. 5 to 8 to be described later.

Figure 5:
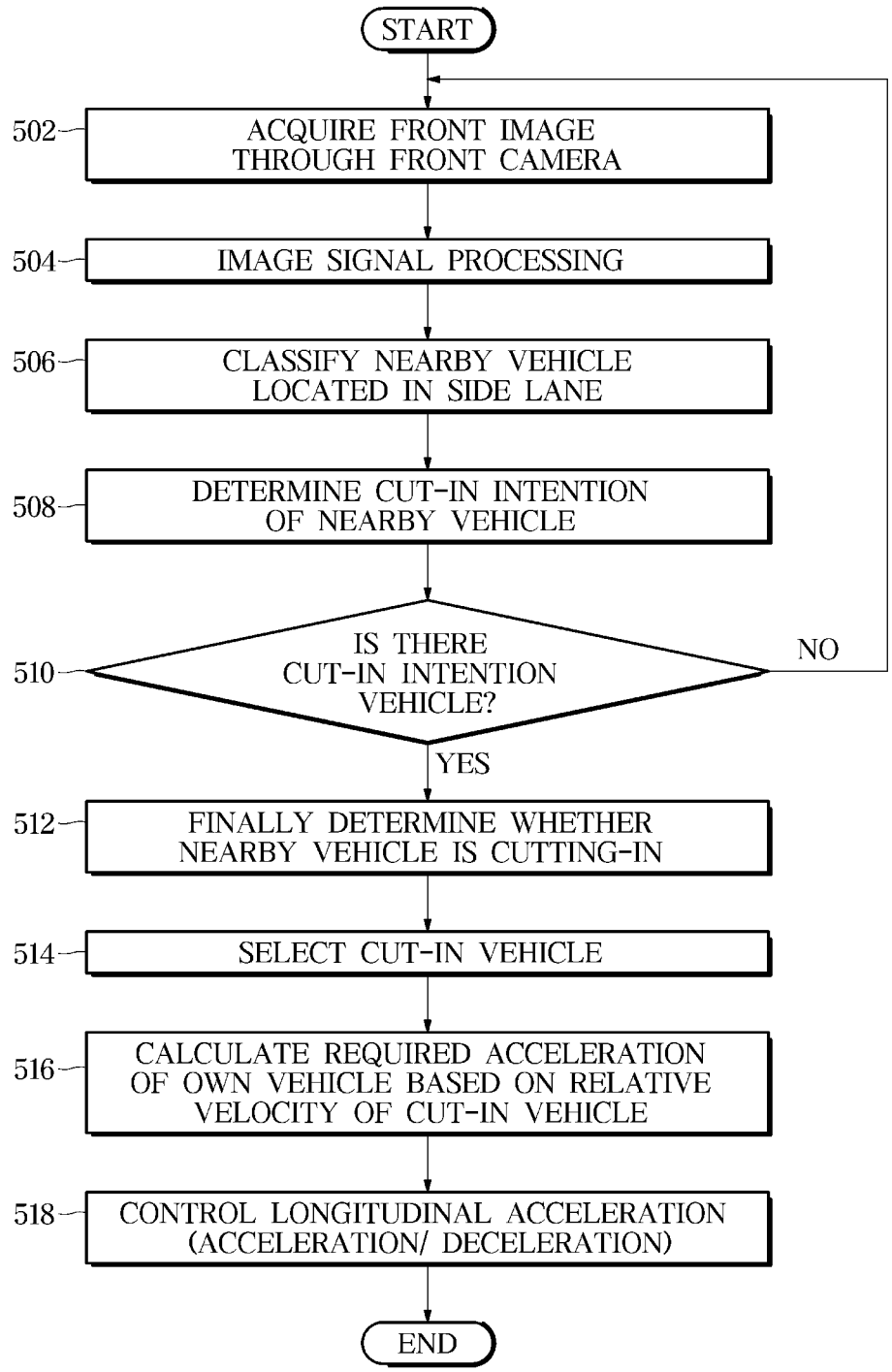
FIG. 5 is a diagram illustrating a control method of a vehicle according to an embodiment.

FIG. 5 is a diagram illustrating a control method of a vehicle according to an embodiment. In the control method of vehicle of FIG. 5, a process of performing an evasive maneuver by quickly and accurately determining whether a nearby vehicle is cutting-in is shown.

As shown in FIG. 5, the controller 140 of the DAS 100 of the vehicle 1 according to an embodiment of the present disclosure acquires a front image by photographing the front of the host vehicle 1 through the front camera 110 (502). This front image includes not only the front of the host vehicle 1, but also an image of the front left and the front right. Acquisition of an image photographed in front of vehicle 1 is to identify the line of the travel lane in which vehicle 1 is running and the preceding vehicle, and acquisition of the left front image and the right front image of the vehicle 1 is to identify a nearby vehicle.

The processor 141 of the controller 140 receives the signal of the image photographed in front of the host vehicle 1 through the front camera 110 and performs signal processing such as filtering and digital conversion. (504).

The processor 141 of the controller 140 classifies a nearby vehicle located in the side lane (506). That is, a nearby vehicle (other vehicle) located in the left front or right front of the host vehicle (1) is classified through the analysis of the front image. Since the judgment and selection of the cut-in vehicle is to judge and select other vehicles cutting-in from the adjacent lane to the travel lane, in order to determine the cut-in vehicle, it is first necessary to identify and classify other vehicles that are driving adjacent lanes, that is, nearby vehicles.

When the identification and classification of the nearby vehicle is completed, the processor 141 of the controller 140 determines the cut-in intention of the identified nearby vehicle (508). That is, the cut-in intentions of other vehicles traveling in the adjacent lane are determined by applying a determination reference prepared in advance of the vehicle 1 according to the present disclosure. In the vehicle 1 according to the present disclosure, the determination of the cut-in intention of a nearby vehicle may be made based on line information in a front image photographed through the front camera 120.

Figure 6:
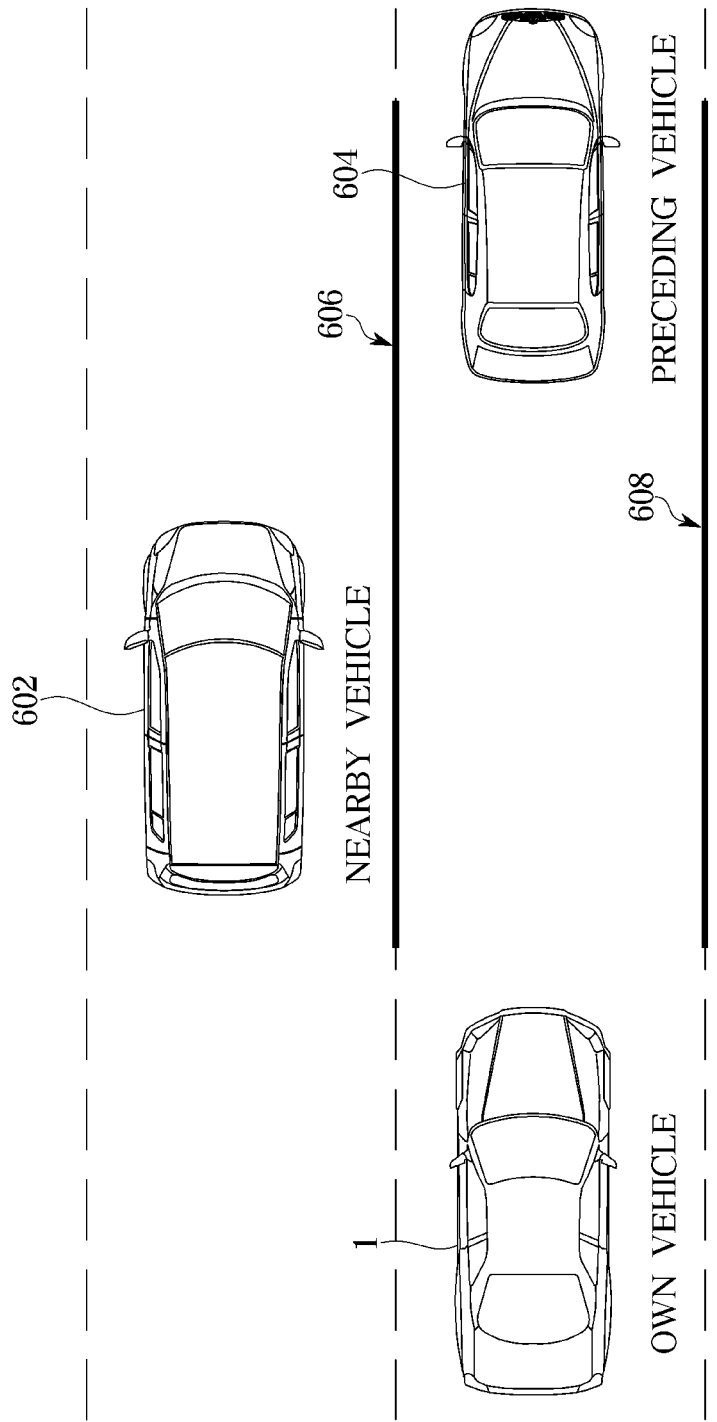
FIG. 6 is a diagram illustrating line information included in a front image acquired through a front camera of a vehicle according to an embodiment when there is no vehicle having cut-in intention.

FIG. 6 is a diagram illustrating line information included in a front image acquired through a front camera of a vehicle according to an embodiment when there is no vehicle having cut-in intention. As shown in FIG. 6, while there is no vehicle attempting to cut-in and the nearby vehicle 602 and the preceding vehicle 604 travel in their respective lanes, the lengths of the left line 606 and the right line 608 in the front image photographed by the front camera 120 of the host vehicle 1 are the same as shown in FIG. 6.

Figure 7:
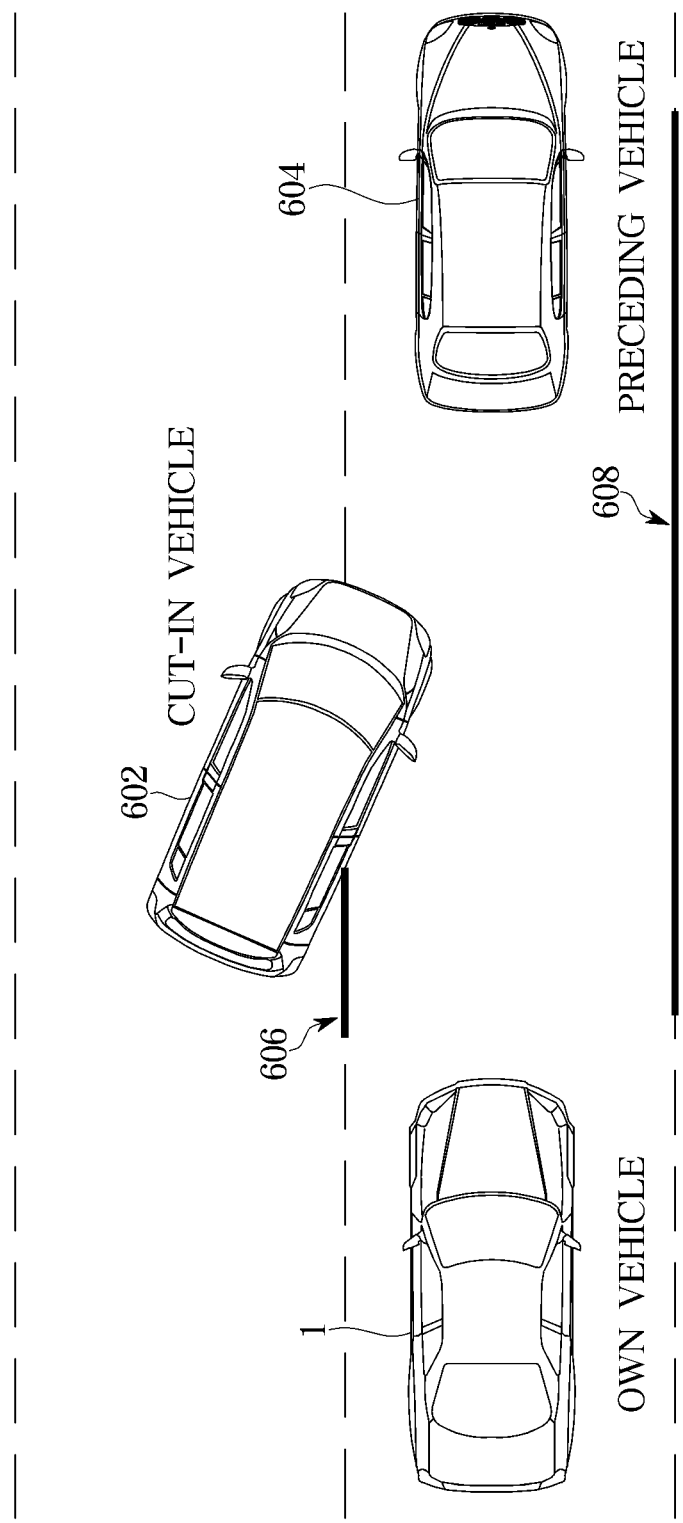
FIG. 7 is a diagram illustrating line information included in a front image acquired through a front camera of a vehicle according to an embodiment when there is a vehicle having cut-in intention.

FIG. 7 is a diagram illustrating line information included in a front image acquired through a front camera of a vehicle according to an embodiment when there is a vehicle having cut-in intention. As shown in FIG. 7, when there is a vehicle attempting to cut-in, the lengths of the left line 606 and the right line 608 in the front image photographed by the front camera 120 of the host vehicle 1 appear differently as shown in FIG. 7. That is, when the cut-in intention vehicle 602 attempts to cut-in from the adjacent lane on the left to the travel lane, the left line 606 in the front image is covered by the cut-in intention vehicle 602 and is relatively shorter than the intact right line 608. As shown in FIG. 7, when the length of the left line 606 in the front image is shorter than the length of the right line 608, the processor 141 of the controller 140 may determine that there is a cut-in intention of the nearby vehicle 602 in the left adjacent lane. When the length of the right line 608 in the front image is shorter than the length of the left line 606, the processor 141 of the controller 140 may determine that there is a cut-in intention of a nearby vehicle in the right adjacent lane.

If there is a cut-in intention vehicle ('Yes' in 510), the processor 141 of the controller 140 finally determines whether a nearby vehicle is cutting-in (512). That is, the processor 141 of the controller 140 finally determines whether other vehicles classified as cut-in intention vehicles actually cut-in by applying another pre-prepared determination reference of the vehicle 1 according to the embodiment of the present disclosure.

As a reference for final determination of cut-in, a distance from the line of the nearby vehicle 602 and a lateral velocity may be exemplified. That is, the degree of penetration of the nearby vehicle 602 into the travel lane is checked through the distance to the line, it is checked how quickly the nearby vehicle 602 penetrates into the travel lane in the lateral direction, and through this confirmation result, it can be finally determined whether the nearby vehicle 602 cuts-in. If the degree of penetration into the travel lane and the lateral velocity among nearby vehicles 602 determined to have a cut-in intention in the preceding step do not meet the preset reference, the nearby vehicle is not confirmed as a cut-in vehicle.

If there are a plurality of vehicles finally determined as the cut-in vehicle, among them, the cut-in vehicle to be paid attention (avoidance) may be selected (514).

When the cut-in vehicle (e.g., 602 in FIG. 6) that should be the first to be paid attention (avoidance) is selected, the required acceleration of the host vehicle 1 is calculated based on the relative velocity of the selected cut-in vehicle 602 and the host vehicle 1 (516). Calculation of the required acceleration of the host vehicle 1 may be calculating a negative acceleration for securing a space in front of the host vehicle 1 so that the cut-in vehicle 602 can safely enter the front travel lane of the host vehicle 1. Conversely, the calculation of required acceleration of the host vehicle 1 may be calculating a positive acceleration for securing a space behind the host vehicle 1 so that the cut-in vehicle 602 can safely enter the rear travel lane of the host vehicle 1 by overtaking the cut-in vehicle 602 by the host vehicle 1.

In this way, when the calculation of the required acceleration of the host vehicle 1 taking into account the cut-in vehicle 602 is completed, acceleration control or deceleration control of the host vehicle 1 is performed based on the calculated required acceleration (518).

Figure 8:
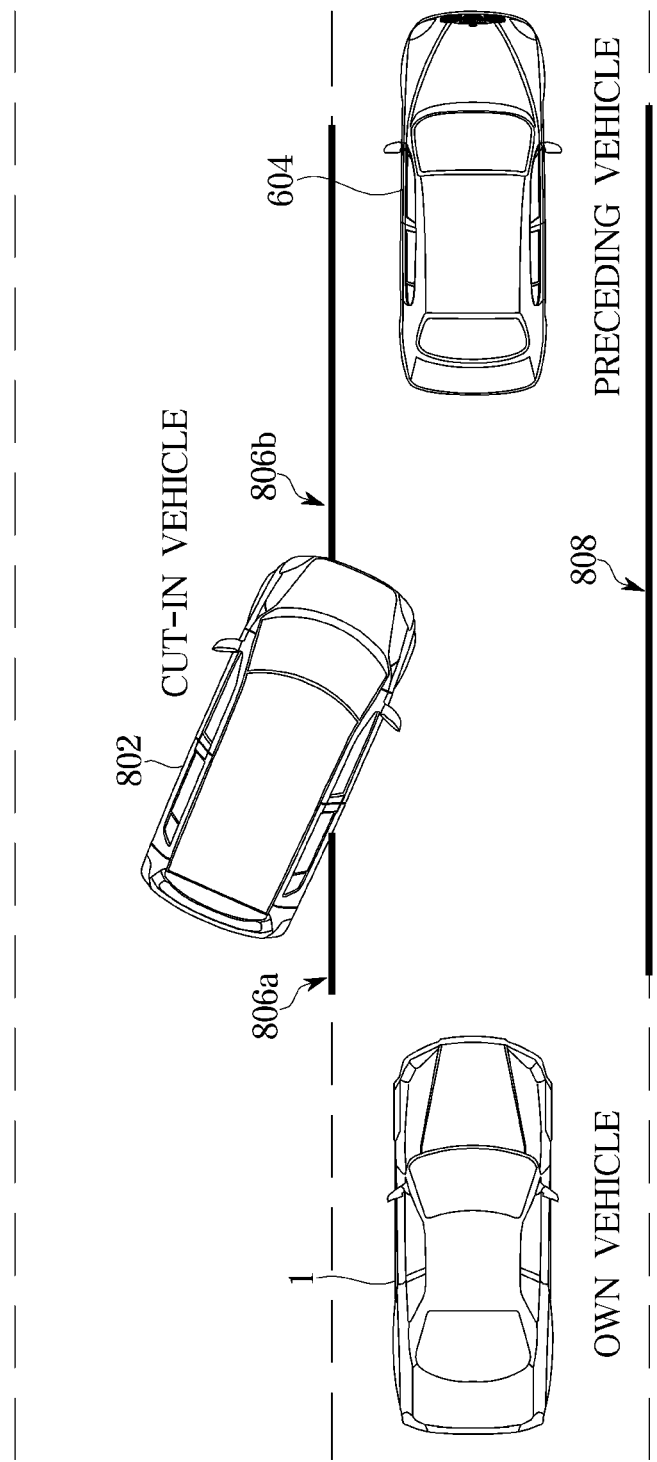
FIG. 8 is a diagram illustrating a concept of identification of a vehicle having cut-in intention according to another embodiment.

FIG. 8 is a diagram illustrating a concept of identification of a vehicle having cut-in intention according to another embodiment.

In FIG. 8, when the cut-in intention vehicle 802 enters the travel lane in the left adjacent lane, in the image of the front camera 120 of the host vehicle 1, the left line of the travel lane is disconnected by the cut-in intention vehicle 802 to appear as two parts 806a and 806b. In this way, when the middle part of at least one of the left line 806 and the right line 808 of the travel lane is disconnected and photographed separated into two lines 806a and 806b as shown in FIG. 8, it can be determined that there is another vehicle 602 attempting to cut-in into the travel lane in the direction of corresponding line.

The above description is merely illustrative of the technical idea, and a person with ordinary knowledge in the technical field of the present disclosure will be able to make various modifications, changes, and substitutions within the range not departing from the essential characteristics. Accordingly, the embodiments disclosed above and the accompanying drawings are not intended to limit the technical idea, but to describe it, and the scope of the technical idea is not limited by the embodiment and the accompanying drawings. The scope of protection should be interpreted by the scope of the claims below, and all technical ideas within the scope of the same should be construed as being included in the scope of the rights.

According to one aspect of the present disclosure, the purpose is to enable quick and accurate recognition of cut-in vehicles that change lanes from adjacent lanes to travel lanes.

What is claimed is:

1. A method of controlling a host vehicle, the method comprising:
    obtaining, by a front camera, a front image by photographing a front of the host vehicle, and storing, in a memory, the front image;
    identifying, by a processor, left and right lines of a travel lane in which the host vehicle is traveling based on line information in the front image after performing, by the processor, a signal processing procedure comprising a filtering and a digital conversion on the front image;
    determining, by the processor, that a vehicle cutting-in from an adjacent lane to the travel lane exists when lengths of the left line and the right line of the travel lane are different from each other; and
    controlling, by the processor, a velocity of the host vehicle upon determining that at the cut-in vehicle exists.

2. The method of claim 1, further comprising:
    identifying a nearby vehicle traveling around the host vehicle from the front image; and
    determining that the cut-in vehicle exists when the lengths of the left line and the right line of the travel lane are different from each other in the front image in the presence of the nearby vehicle.

3. The method of claim 2, further comprising:
    determining that the cut-in vehicle exists on a side where a shorter line between the left line and the right line of the travel lane exists.

4. The method of claim 2, further comprising:
    determining that the cut-in vehicle exists on a side where a middle part is disconnected among the left line and the right line of the travel lane.

5. The method of claim 1, further comprising:
determining cut-in intention of a nearby vehicle from the lengths of the left line and the right line of the travel lane in the front image; and
determining the nearby vehicle as the cut-in vehicle from a lateral velocity and a distance from the line of the nearby vehicle.

6. The method of claim 1, further comprising:
when it is determined that the cut-in vehicle exists, securing an entry space for the cut-in vehicle by adjusting the velocity of the host vehicle according to a relative velocity and a relative distance of the cut-in vehicle.

7. The method of claim 1, further comprising:
when it is determined that the cut-in vehicle exists, securing an entry space for the cut-in vehicle by adjusting the velocity of the host vehicle according to a relative velocity and a relative distance of the cut-in vehicle.

8. The method of claim 1, further comprising:
when it is determined that the cut-in vehicle exists, securing an entry space for the cut-in vehicle by adjusting the velocity of the host vehicle according to a relative velocity and a relative distance of the cut-in vehicle.

9. A host vehicle comprising:
a front camera configured to obtain a front image by photographing a front of the host vehicle; and
a controller comprising a processor and a memory, wherein the memory is configured to store the front image, and the processor is configured to:
identify left and right lines of a travel lane in which the host vehicle is traveling based on line information in the front image after performing a signal processing procedure comprising a filtering and a digital conversion on the front image,
determine that a vehicle cutting-in from an adjacent lane to the travel lane exists when lengths of the left line and the right line of the travel lane are different from each other, and
controlling, by the processor, a velocity of the host vehicle upon determining that at the cut-in vehicle exists.

10. The host vehicle of claim 9, wherein the controller is configured to identify a nearby vehicle traveling around the host vehicle from the front image and determine that the cut-in vehicle exists when the lengths of the left line and the right line of the travel lane are different from each other in the front image in the presence of the nearby vehicle.

11. The host vehicle of claim 10, wherein the controller is configured to determine that the cut-in vehicle exists on a side where a shorter line between the left line and the right line of the travel lane exists.

12. The host vehicle of claim 10, wherein the controller is configured to determine that the cut-in vehicle exists on a side where a middle part is disconnected among the left line and the right line of the travel lane.

13. The host vehicle of claim 9, wherein the controller is configured to determine cut-in intention of a nearby vehicle from the lengths of the left line and the right line of the travel lane in the front image and determine the nearby vehicle as the cut-in vehicle from a lateral velocity and a distance from the line of the nearby vehicle.

14. A method of controlling a host vehicle, the method comprising:
obtaining, by a front camera, a front image by photographing the front of the host vehicle, and storing, in a memory, the front image;
identifying, by a processor, a nearby vehicle traveling around the host vehicle from the front image and left and right lines of a travel lane in which the vehicle is traveling based on line information in the front image after performing, by the processor, a signal processing procedure comprising a filtering and a digital conversion on the front image;
determining, by the processor, that a vehicle cutting-in from an adjacent lane to the travel lane exists when lengths of the left line and the right line of the travel lane are different from each other in the front image in the presence of the nearby vehicle;
determining, by the processor, that the cut-in vehicle exists on a side where a shorter line between the left line and the right line of the travel lane exists or on a side where a middle part is disconnected among the left line and the right line of the travel lane, and
controlling, by the processor, a velocity of the host vehicle upon determining that at the cut-in vehicle exists.

15. A non-transitory computer-readable medium storing computer-executable instructions when executed by a processor to perform a method of controlling a host vehicle, the method comprising:
obtaining, by a front camera, a front image by photographing a front of the host vehicle, and storing, in a memory, the front image;
identifying, by the processor, left and right lines of a travel lane in which the host vehicle is traveling based on line information in the front image after performing, by the processor, a signal processing procedure comprising a filtering and a digital conversion on the front image;
determining, by the processor, that a vehicle cutting-in from an adjacent lane to the travel lane exists when lengths of the left line and the right line of the travel lane are different from each other; and
controlling, by the processor, a velocity of the host vehicle upon determining that at the cut-in vehicle exists.

16. The non-transitory computer-readable medium of claim 15, further comprising:
identifying a nearby vehicle traveling around the host vehicle from the front image; and
determining that the cut-in vehicle exists when the lengths of the left line and the right line of the travel lane are different from each other in the front image in the presence of the nearby vehicle.

17. The non-transitory computer-readable medium of claim 16, further comprising:
determining that the cut-in vehicle exists on a side where a shorter line between the left line and the right line of the travel lane exists.

18. The non-transitory computer-readable medium of claim 16, further comprising:
determining that the cut-in vehicle exists on a side where a middle part is disconnected among the left line and the right line of the travel lane.

19. The non-transitory computer-readable medium of claim 15, further comprising:
determining cut-in intention of a nearby vehicle from the lengths of the left line and the right line of the travel lane in the front image; and
determining the nearby vehicle as the cut-in vehicle from a lateral velocity and a distance from the line of the nearby vehicle.

* * * * *